Patented Dec. 26, 1922.

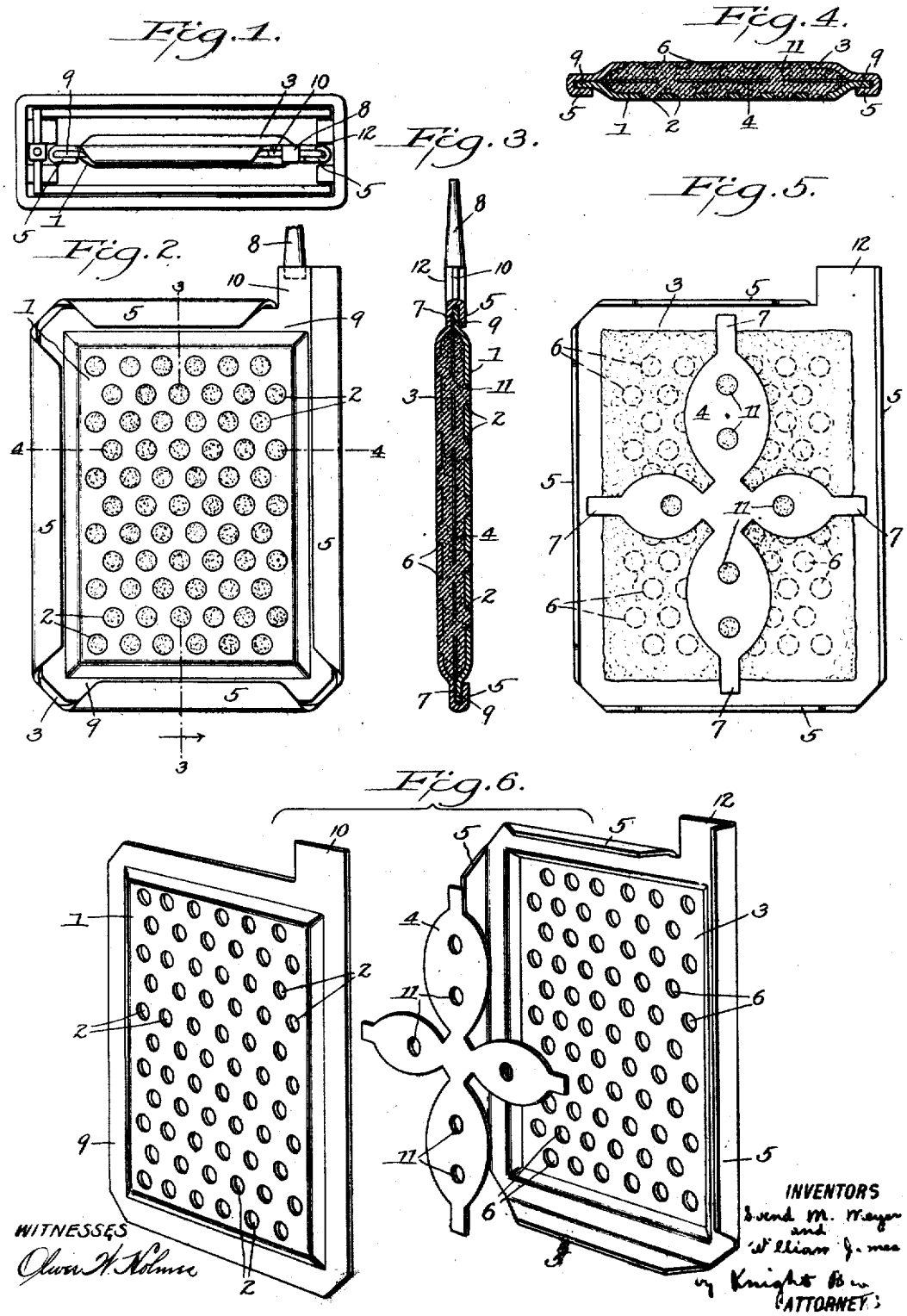

1,440,023

UNITED STATES PATENT OFFICE.

SVEND M. MEYER AND WILLIAM JAMES, OF BROOKLYN, NEW YORK, ASSIGNORS TO MAGNO STORAGE BATTERY CORPORATION, OF NEW YORK, N. Y., A CORPORATION OF DELAWARE.

STORAGE BATTERY.

Application filed October 29, 1921. Serial No. 511,295.

*To all whom it may concern:*

Be it known that we, SVEND M. MEYER and WILLIAM JAMES, citizens of the United States, and residents of the borough of Brooklyn, county of Kings, city and State of New York, have invented certain new and useful Improvements in Storage Batteries, of which the following is a specification.

Our present invention relates to the structure of the positive electrode of an electric storage battery. The object of our invention is to produce a positive electrode that will have a longer life, be physically stronger and recuperate more quickly after heavy discharge.

To accomplish this object, our positive electrode is constructed in the form of a box with perforated sides, the perforations being arranged in a particular manner. The active material is placed within this box and in the center of the active material is a metallic collector of such shape that the action in the active material on discharge will bring about the desired object.

In order that the invention may be fully understood, it will first be described in connection with the accompanying drawings and afterwards more particularly pointed out in the annexed claim.

In said drawings:—

Figure 1 is a plan view of our positive plate shown in a suitable container in connection with two negative electrodes.

Figure 2 is a side elevation.

Figure 3 is a vertical, transverse, sectional view taken on the lines 3—3 of Figure 2.

Figure 4 is a sectional view taken on the lines 4—4 of Figure 2.

Figure 5 is a vertical, sectional view through the center of the electrode showing the collector in elevation.

Figure 6 is a perspective view of the two plates which form the sides of the electrode and also the collector.

Similar numerals refer to similar parts throughout the views.

In making up our electrode, a dished front plate 1, Figure 6, is formed with a shallow depression extending over its surface and with a flange 9 around the periphery. On one corner of this plate, an extension 10 is provided to act as a terminal. Perforations 2 are made in staggered rows. Back plate 3 is made in a similar manner except that it has added flanges 5 bent at right angles to the plate. Extension 12 acts as a terminal for electrical connection. A collector or distributor 4, consisting of four leaves extending outwardly from a central portion, having tips 7, and provided with perforations 11, is also used. The depressions in plates 1 and 3 are filled with a paste of active material pressed in so that the perforations are completely filled and the inside surfaces flush with the flanges. The active material may consist of lead oxide mixed with glycerine, sulphuric acid and water as a binder, or we may use a mixture of litharge and red lead with a carbon substance to increase the conductivity. Collector 4 is placed on back plate 3, as shown in Figure 5, and front plate 1 brought firmly in contact with plate 3 and the flanges 5 bent over flanges 9, thereby locking the front and back plates together and making a strong box-like structure with the active material and collector 4 on the inside. It will be observed that the tips 7 of the leaves of the collector 4 are clamped between flanges of members 1 and 3, thus making a good electrical connection thereto. The extensions 10 and 12 come opposite each other and current is supplied to and taken from the electrode through them by the post 8 which is attached to 10 and 12 by any suitable means such as by welding.

We have found that the arrangement of the perforations in the front plate, in relation to the perforations in the back plate, is very important in preventing buckling. Referring to Figures 3 and 4, it is seen that the perforations 2 are staggered in relation to the perforations 6, both vertically and horizontally.

Due to its position in the center of the active material, the collector 4 is the chief factor in distributing and collecting the current during charge and discharge. We have found that the shape and size of the collector are very important for the proper functioning of the electrode. We have further found that the shape of the collector should be such that the electro-chemical action will be largely at the center of the electrode at the beginning of charge or discharge and will proceed toward the corners of the electrode as charge or discharge proceeds. Also that the size of the collector in relation to the size of the electrode should be such that on short-circuit, the discharge current will be limited by resistance in the active material. Under such conditions, when the short-circuit is removed, the electrode recuperates very quickly due to local action between those portions of the active material that are more remote from the collector and those portions adjacent to it. By so limiting the maximum current that can be drawn from the electrode its life is very materially prolonged. The collector or distributor 4 is preferably made in the form of a conventional quadrifoil figure, as shown in Figure 5, in which its total area is equivalent to approximately one-quarter the area of the whole electrode.

We prefer to make plates 1 and 3 of hard lead (6% antimony) about one-sixteenths of an inch thick and the collector 4 of soft lead (substantially pure lead) about one-thirty seconds of an inch thick.

We claim:—

A positive electrode for storage batteries having a case for containing the active material consisting of front and back plates of perforated lead sheets, the edges of one overlapping and enveloping the edges of the other on the four edges and a central collector member of perforated sheet lead having wings extending in between the said enveloping edges and being clamped and held thereby.

SVEND M. MEYER.
WILLIAM JAMES.